United States Patent
Hu et al.

(10) Patent No.: US 12,206,287 B2
(45) Date of Patent: Jan. 21, 2025

(54) SINGLE-PHASE PERMANENT MAGNET SYNCHRONOUS MOTOR AND DUST COLLECTOR

(71) Applicant: Gree Electric Appliances, Inc. of Zhuhai, Guangdong (CN)

(72) Inventors: Yusheng Hu, Guangdong (CN); Bin Chen, Guangdong (CN); Yong Xiao, Guangdong (CN); Zhidong Zhang, Guangdong (CN); Jinfei Shi, Guangdong (CN); Shengyu Xiao, Guangdong (CN); Xia Li, Guangdong (CN); Lin Tang, Guangdong (CN); Shaoxuan Zhu, Guangdong (CN); Pengqian Gui, Guangdong (CN); Hui Sun, Guangdong (CN); Jiating Ding, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 197 days.

(21) Appl. No.: 17/765,299

(22) PCT Filed: Aug. 25, 2020

(86) PCT No.: PCT/CN2020/111027
§ 371 (c)(1),
(2) Date: Mar. 30, 2022

(87) PCT Pub. No.: WO2021/114723
PCT Pub. Date: Jun. 17, 2021

(65) Prior Publication Data
US 2022/0368181 A1    Nov. 17, 2022

(30) Foreign Application Priority Data
Dec. 9, 2019    (CN) .......................... 201911253540.X (51) Int. Cl.
*H02K 1/16*    (2006.01)
*H02K 1/14*    (2006.01)
(Continued)

(52) U.S. Cl.
CPC ............... *H02K 1/27* (2013.01); *H02K 1/141* (2013.01); *H02K 1/16* (2013.01); *H02K 19/04* (2013.01);
(Continued)

(58) Field of Classification Search
USPC ...................................... 310/216.097–216.98
See application file for complete search history.

(56) References Cited

U.S. PATENT DOCUMENTS

| 4,583,015 A | 4/1986 | Toshimitsu |
| 2006/0097598 A1 | 5/2006 | Lelkes et al. |

(Continued)

FOREIGN PATENT DOCUMENTS

| CN | 202094713 U | 12/2011 |
| CN | 203193470 U | 9/2013 |

(Continued)

OTHER PUBLICATIONS

Ding, CN203193470 Machine Translation, Sep. 2013 (Year: 2013).*
(Continued)

*Primary Examiner* — Eric Johnson
(74) *Attorney, Agent, or Firm* — The Webb Law Firm (57) ABSTRACT

A single-phase permanent magnet synchronous motor and dust collector. The single-phase permanent magnet synchronous motor includes a plurality of stator teeth, the plurality of stator teeth include at least: a first-type and second-type stator tooth; the first-type and second-type stator teeth enclose an annular working cavity for accommodating a rotor part, where the size of a central angle corresponding to a first contour line of an end face of the first-type stator tooth (Continued)

facing the rotor part is different from the size of a central angle corresponding to a second contour line of an end face of the second-type stator tooth facing the rotor part. The motor has a significantly reduced cogging torque, a greatly reduced torque ripple, and an obviously increased motor output torque. The single-phase permanent magnet synchronous motor is small in size, light in weight, simple in structure, convenient for large-scale manufacture and low in manufacturing cost.

16 Claims, 8 Drawing Sheets

(51) Int. Cl.
*H02K 1/27* (2022.01)
*H02K 19/04* (2006.01)

(52) U.S. Cl.
CPC ..... *H02K 2201/03* (2013.01); *H02K 2213/03* (2013.01)

(56) References Cited

U.S. PATENT DOCUMENTS

| | | | | |
|---|---|---|---|---|
| 2007/0080599 | A1* | 4/2007 | Telep | H02K 1/14 310/216.001 |
| 2007/0252447 | A1* | 11/2007 | Ionel | H02K 29/03 310/44 |
| 2017/0055669 | A1 | 3/2017 | Li et al. | |
| 2017/0170693 | A1* | 6/2017 | Dymond | H02K 37/16 |

FOREIGN PATENT DOCUMENTS

| | | |
|---|---|---|
| CN | 104079085 A | 10/2014 |
| CN | 104410177 A | 3/2015 |
| CN | 204244045 U | 4/2015 |
| CN | 106487187 A | 3/2017 |
| CN | 110912293 A | 3/2020 |
| CN | 211151633 U | 7/2020 |
| JP | S5869457 A | 4/1983 |
| JP | S6218958 A | 1/1987 |
| JP | H0556614 A | 3/1993 |
| JP | H0555750 U * | 7/1993 |
| JP | H06113515 A | 4/1994 |
| JP | H08172759 A | 7/1996 |
| JP | 2002044919 A | 2/2002 |
| JP | 2004215479 A | 7/2004 |
| JP | 2013219918 A | 10/2013 |
| JP | 2017123772 A | 7/2017 |

OTHER PUBLICATIONS

JPH0555750U Machine Translation , Jul. 1993 (Year: 1993).*
CN 201911253540.X, "Notice of First Examination Opinion", Nov. 27, 2024.

* cited by examiner

SINGLE-PHASE PERMANENT MAGNET SYNCHRONOUS MOTOR AND DUST COLLECTOR

CROSS-REFERENCE TO RELATED APPLICATIONS

This application is the United States national phase of International Application No. PCT/CN2020/111027 filed Aug. 25, 2020, and claims priority to Chinese patent application No. 201911253540.X, filed on Dec. 9, 2019, the disclosures of which are hereby incorporated by reference in their entirety.

BACKGROUND OF THE DISCLOSURE

The present disclosure relates to the technical field of motor equipment, and in particular, to a single-phase permanent magnet synchronous motor and a dust collector.

DESCRIPTION OF RELATED ART

A single-phase motor has a single-phase winding, which requires few switching devices in a drive main circuit, and its control system has a low hardware cost. However, a magnetic field in the single-phase motor is a pulsating magnetic field, and an electromagnetic torque of the motor has a position at a point 0. If it does not use a specific structure, a motor stop position (a point where a cogging torque is 0) coincides with the point where the electromagnetic torque is 0. In this case, regardless of the form of current applied, the motor cannot be started, and thus has a problem of a start-up dead point.

Usually, a single-phase permanent magnet motor uses an unequal air gap (that is, an air gap thickness changes under a same stator tooth) to solve the start-up dead point problem, such as using a gradual-change air gap structure. In the related art, all single-phase motors use a uniform air gap and gradual-change air gap structure (unequal air gap), which increases the cogging torque of the motor while solving the start-up dead point problem of the motor, resulting in an increased output torque ripple of the motor and aggravates the generation of motor noise. Moreover, the unequal air gap structure increases an average air gap length of the motor, which decreases output torque density of the motor.

SUMMARY OF THE DISCLOSURE

Based on this, the present disclosure provides a single-phase permanent magnet synchronous motor and a dust collector to solve the problem of a start-up dead point in starting of a motor in the related art.

The present disclosure provides a single-phase permanent magnet synchronous motor, which includes a plurality of types of stator teeth, the plurality of types of stator teeth including at least: a first-type stator tooth; and a second-type stator tooth, the first-type stator tooth and the second-type stator tooth enclosing an annular working cavity for accommodating a rotor part, wherein size of a central angle corresponding to a first contour line of an end face of the first-type stator tooth facing the rotor part is different from the size of a central angle corresponding to a second contour line of an end face of the second-type stator tooth facing the rotor part.

In some embodiments, in the first-type stator tooth and the second-type stator tooth adjacent to each other, a geometric centerline of the first contour line in a radial direction of the rotor part and a geometric centerline of the second contour line in the radial direction of the rotor part intersect and form an included angle γ, wherein γ≠2π/s, where s is the total number of the first-type stator tooth and the second-type stator tooth.

In some embodiments, s=2n, the number of the first-type stator tooth is n, the number of the first-type stator tooth and the number of the second-type stator tooth are n, and n is an integer greater than or equal to 1.

In some embodiments, there are a plurality of first-type stator teeth and a plurality of second-type stator teeth, and the plurality of first-type stator teeth and second-type stator teeth are arranged alternately circumferentially of the rotor part.

In some embodiments, along a rotating direction of the rotor part, the size of the central angle corresponding to the first contour line is greater than the size of the central angle corresponding to the second contour line, wherein with the second-type stator tooth as a reference starting point, along the rotating direction of the rotor part, a central angle formed by geometric centerlines of the contour lines of the end faces of the second-type stator tooth and the first-type stator tooth adjacent to the second-type stator tooth on the side facing the rotor part is smaller than 2π/s.

In some embodiments, with the geometric centerline of the second contour line in the radial direction of the rotor part as a reference line, an offset baseline of the first-type stator tooth is formed at an angle of 2π/s along the rotating direction of the rotor part, and an offset angle θ is formed between the geometric centerline of the first contour line in the radial direction of the rotor part and the offset baseline, wherein θ=a−b, 0<θ<π/2−α, where α is a central angle formed by connecting lines between two ends of the second contour line and a geometric center of the rotor part, and b is a central angle formed by the offset baseline and a connecting line between a front end of the first contour line and the geometric center of the rotor part, and a is a central angle formed by the offset baseline of the first-type stator tooth and a connecting line between a rear end of the first contour line and the geometric center of the rotor part.

In some embodiments, a uniform air gap thickness g2 is formed between the second-type stator tooth and the rotor part, and a uniform air gap thickness g1 is formed between the first-type stator tooth and the rotor part, wherein g1=g2.

In some embodiments, a uniform air gap thickness g2 is formed between the second-type stator tooth and the rotor part, and a uniform air gap thickness g1 is formed between the first-type stator tooth and the rotor part, wherein g1<g2.

In some embodiments, the thickness of an air gap formed between the second-type stator tooth and the rotor part is set to gradually increase or gradually decrease along the circumference of the rotor part, and the thickness of an air gap formed between the first-type stator tooth and the rotor part is set to gradually increase or gradually decrease along the circumference of the rotor part; or the thickness of an air gap formed between the second-type stator tooth and the rotor part is set to gradually increase or gradually decrease along the circumference of the rotor part, or the thickness of an air gap formed between the first-type stator tooth and the rotor part is set to gradually increase or gradually decrease along the circumference of the rotor part.

In some embodiments, there are a plurality of first-type stator teeth and a plurality of second-type stator teeth, and the plurality of first-type stator teeth and the plurality of second-type stator teeth enclose an annular working cavity; and the plurality of first-type stator teeth at least include two first-type stator teeth arranged adjacent to each other, and the plurality of second-type stator teeth at least include two first-type stator teeth arranged adjacent to each other; or the plurality of first-type stator teeth at least include two first-type stator teeth arranged adjacent to each other, or the plurality of second-type stator teeth at least include two first-type stator teeth arranged adjacent to each other.

In some embodiments, the single-phase permanent magnet synchronous motor includes: a first stator body, with the plurality of first-type stator teeth being connected to the first stator body; and a second stator body, the second stator body being arranged opposite to the first stator body, with the plurality of second-type stator teeth being connected to the second stator body.

In some embodiments, a central angle formed by connecting lines between two geometric centers of the first contour lines of two adjacent first-type stator teeth and the geometric center of the rotor part is γ1, and a central angle formed by connecting lines between two geometric centers of two adjacent second contour lines of the second stator body and the geometric center of the rotor part is also γ1; or a central angle formed by connecting lines between two geometric centers of the first contour lines of two adjacent first-type stator teeth and the geometric center of the rotor part is γ1, or a central angle formed by connecting lines between two geometric centers of two adjacent second contour lines of the second stator body and the geometric center of the rotor part is also γ1, wherein γ1=2π/s.

In some embodiments, with the first-type stator tooth as a reference starting point, a central angle formed by a connecting line between the geometric center of the first contour line and the geometric center of the rotor part, and a connecting line between the second contour center of the second-type stator tooth adjacent to the first-type stator tooth in the rotating direction of the rotor part and the geometric center of the rotor part is γ3, wherein γ3>2π/s.

In some embodiments, with the second-type stator tooth as a reference starting point, a central angle formed by a connecting line between the geometric center of the first contour line of the first-type stator tooth adjacent thereto in the rotating direction of the rotor part and the geometric center of the rotor part, and a connecting line between the geometric center of the second contour of the second-type stator tooth and the geometric center of the rotor part is γ2, wherein γ2<2π/s.

In some embodiments, the first stator body is integrally formed with the second stator body, and the transverse cross-section of the first stator body and the second stator body is circular or rectangular.

In some embodiments, the first stator body and the second stator body are arranged with a distance therebetween; and adjacent surfaces of the first stator body and the second stator body are provided with recessed portions.

In some embodiments, there are a plurality of first-type stator teeth and a plurality of second-type stator teeth, and the number of the first-type stator teeth and the number of the second-type stator teeth are different.

In some embodiments, the structure of at least one first-type stator tooth of the plurality of first-type stator teeth is different from the structures of the other first-type stator teeth and the second-type stator teeth.

The present disclosure provides a dust collector, which includes a single-phase permanent magnet synchronous motor including a plurality of types of stator teeth, the plurality of types of stator teeth including at least: a first-type stator tooth; and a second-type stator tooth, the first-type stator tooth and the second-type stator tooth enclosing an annular working cavity for accommodating a rotor part, wherein the size of a central angle corresponding to a first contour line of an end face of the first-type stator tooth facing the rotor part is different from the size of a central angle corresponding to a second contour line of an end face of the second-type stator tooth facing the rotor part.

In some embodiments, in the first-type stator tooth and the second-type stator tooth adjacent to each other, a geometric centerline of the first contour line in a radial direction of the rotor part and a geometric centerline of the second contour line in the radial direction of the rotor part intersect and form an included angle γ, wherein γ≠2π/s, where s is the total number of the first-type stator tooth and the second-type stator tooth.

Using the technical solutions of the present disclosure, by configuring the stator teeth of the motor into multiple types of tooth structures, and configuring the central angles corresponding to the contour lines of the different tooth structures into different sizes, i.e., by offset design of some of the stator teeth of the motor, the motor start-up dead point is eliminated, and the motor output torque can be increased. Compared with an ordinary single-phase permanent magnet motor, the motor provided in the present disclosure has a significantly reduced cogging torque, a greatly reduced torque ripple, and an obviously increased motor output torque. The single-phase permanent magnet synchronous motor of the present disclosure is small in size, light in weight, simple in structure, convenient for large-scale manufacture and low in manufacturing cost.

BRIEF DESCRIPTION OF THE DRAWINGS

The drawings as a part of the present disclosure are used to provide further understanding of the present disclosure. The exemplary embodiments of the present disclosure and description thereof are used for explaining rather than unduly limiting the present disclosure. In the drawings.

The above drawings include the following reference signs:

10—first-type stator tooth; 20—second-type stator tooth; 30—rotor part; 40—first stator body; 50—second stator body; 60—recessed portion.

DETAILED DESCRIPTION

It is to be noted that embodiments in the present disclosure and features in the embodiments are combined with each other in some includes embodiments without conflicts. The present disclosure will be described in detail below with reference to the accompanying drawings in conjunction with embodiments.

It is to be noted that terms as used herein are only for describing specific implementations, and are not intended to limit exemplary implementations according to the present disclosure. As used herein, unless otherwise indicated clearly in the context, a singular form is also intended to include a plural form. In addition, it should also be understood that the terms "comprise" and "include", when used in this specification, indicate the presence of features, steps, operations, devices, components, and combinations thereof.

It is to be noted that the terms "first", "second" and the like in the description and claims of the present disclosure and the above-mentioned drawings are used for distinguishing similar objects, and do not need to be used for describing a specific order or sequence. It should be understood that terms so used are interchangeable in some embodiments under appropriate circumstances so that the implementations of the present disclosure described herein can, for example, be implemented in an order other than those illustrated or described herein. In addition, the terms "include" and "have" and any variations thereof are intended to cover non-exclusive inclusion, e.g., a process, method, system, product or apparatus that includes a series of steps or units does not need to be limited to steps or units that are clearly listed, but includes other steps or units that are not clearly listed or are inherent to the process, method, product or apparatus.

Now, exemplary implementations according to the present disclosure will be described in more detail with reference to the accompanying drawings. However, these exemplary implementations are implemented in a variety of different forms in some embodiments, and should not be construed as limited to the implementations set forth herein. It should be understood that these implementations are provided to make the disclosure of the present disclosure thorough and complete and to fully convey the conception of these exemplary implementations to those of ordinary skill in the art. In the drawings, for the sake of clarity, the thicknesses of layers and regions are increased in some embodiments, and same reference signs are used to represent same devices, and thus their description will be omitted.

Referring to FIGS. 1 to 13, a single-phase permanent magnet synchronous motor is provided according to a specific embodiment of the present disclosure.

Figure 1:
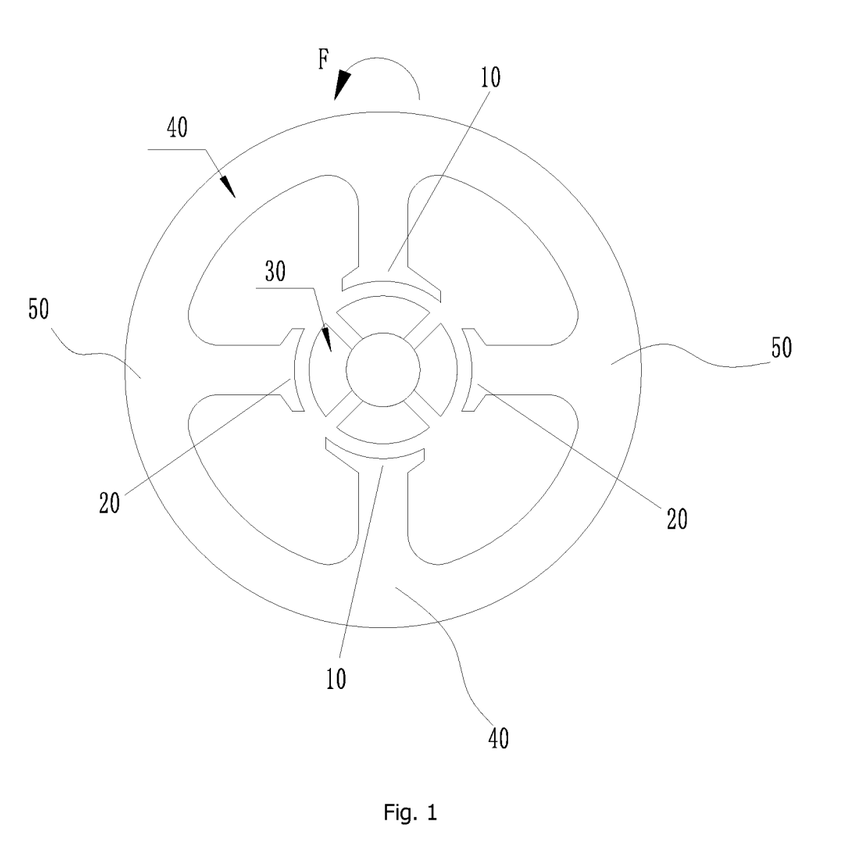
FIG. 1 shows a schematic structural diagram of a first embodiment of a single-phase permanent magnet synchronous motor according to the present disclosure.

In some embodiments, referring to FIG. 1, the single-phase permanent magnet synchronous motor includes first-type stator teeth 10 and second-type stator teeth 20. The first-type stator teeth 10 and the second-type stator teeth 20 enclose an annular working cavity for accommodating a rotor part 30. The size of a central angle corresponding to a first contour line of an end face of a first-type stator tooth 10 facing the rotor part 30 is different from the size of a central angle corresponding to a second contour line of an end face of a second-type stator tooth 20 facing the rotor part 30.

In some embodiments, by configuring the stator teeth of the motor into multiple types of tooth structures, and configuring the central angles corresponding to the contour lines of the different tooth structures into different sizes, i.e., by offset design of some of the stator teeth of the motor, the motor start-up dead point is eliminated, and the motor output torque can be increased. Compared with an ordinary single-phase permanent magnet motor, the motor provided in the present disclosure has a significantly reduced cogging torque, a greatly reduced torque ripple, and an obviously increased motor output torque. The single-phase permanent magnet synchronous motor of the present disclosure is small in size, light in weight, simple in structure, convenient for large-scale manufacture and low in manufacturing cost.

There are at least two types of stator teeth in the motor, and the sizes of central angles corresponding to contour lines of end faces of different types of stator teeth facing a rotor part are different. The stator teeth enclose an annular working cavity for accommodating the rotor part. As to the stator teeth of the motor, at least one set of adjacent stator teeth among all adjacent two stator teeth satisfies that a central angle formed by centerlines of the contour lines of the end faces of the two stator teeth on the side facing the rotor part is not equal to $2\pi/s$, where s is the number of the stator teeth included in the motor. In some embodiments, in the case where there are only two types of stator teeth, they are defined as first-type stator teeth and second-type stator teeth.

Figure 2:
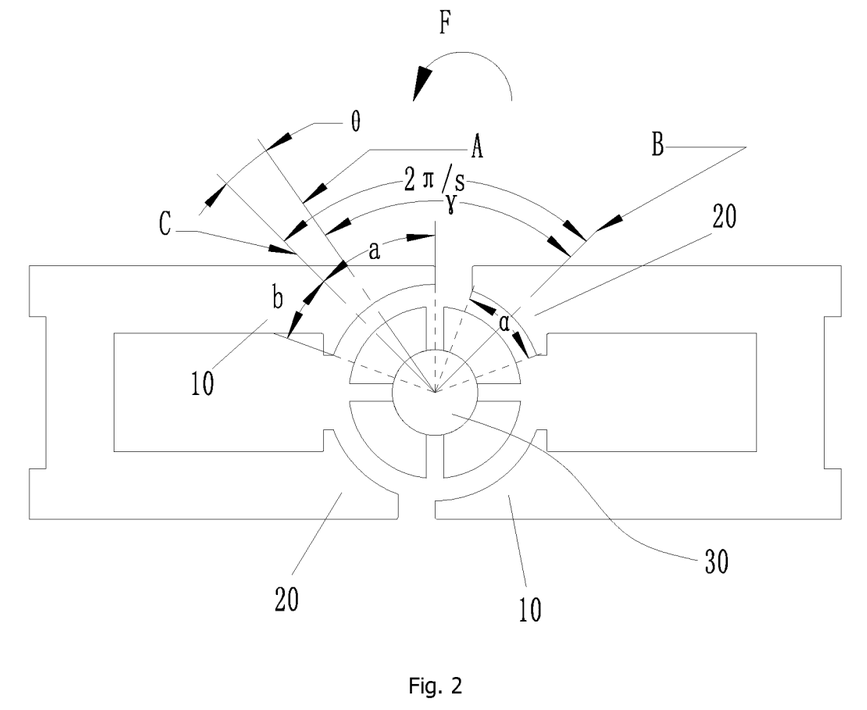
FIG. 2 shows a schematic structural diagram of a second embodiment of the single-phase permanent magnet synchronous motor according to the present disclosure.

In a first-type stator tooth 10 and a second-type stator tooth 20 adjacent to each other, a geometric centerline of the first contour line in a radial direction of the rotor part 30 and a geometric centerline of the second contour line in the radial direction of the rotor part 30 intersect and form an included angle $\gamma$, where $\gamma \neq 2\pi/s$. s is the total number of the first-type stator teeth 10 and the second-type stator teeth 20. Referring to FIGS. 1 to 2, F in the figures is a rotating direction of the rotor part, A is the geometric centerline of the first contour line, B is the geometric centerline of the second contour line, and C is an offset baseline. s=2n, the number of the first-type stator teeth 10 is n, the number of the first-type stator teeth 10 and the number of the second-type stator teeth 20 are n, and n is an integer greater than or equal to 1.

In some embodiments, there are a plurality of first-type stator teeth 10 and a plurality of second-type stator teeth 20. The plurality of first-type stator teeth 10 and second-type stator teeth 20 are arranged alternately circumferentially of the rotor part 30. Stator teeth of the same type are obtained by rotating a single stator tooth around a geometric center of the rotor through a circumferential array. Along the rotating direction of the rotor part 30, the size of the central angle corresponding to the first contour line is greater than the size of the central angle corresponding to the second contour line. With the second-type stator tooth 20 as a reference starting point, along the rotating direction of the rotor part 30, a central angle formed by geometric centerlines of the contour lines of the end faces of the second-type stator tooth and the first-type stator tooth 10 adjacent to the second-type stator tooth 20 facing the rotor part is smaller than $2\pi/s$. Such configuration can improve the performance of the motor.

Referring to FIG. 2, with the geometric centerline of the second contour line in the radial direction of the rotor part 30 as a reference line, an offset baseline of the first-type stator tooth 10 is formed at an angle of $2\pi/s$ along the rotating direction of the rotor part 30, and an offset angle $\theta$ is formed between the geometric centerline of the first contour line in the radial direction of the rotor part 30 and the offset baseline. $\theta=a-b$, and $0<\theta<\pi/2-\alpha$, where $\alpha$ is a central angle formed by connecting lines between two ends of the second contour line and a geometric center of the rotor part 30, and b is a central angle formed by the offset baseline and a connecting line between a front end of the first contour line (i.e., a front end of the stator tooth, wherein along the rotating direction of the rotor part, an end that rotates into a preset point first is the front end, and vice versa, an end that turns into the preset point later is a rear end) and the geometric center of the rotor part 30. $\alpha$ is a central angle formed by the offset baseline of the first-type stator tooth 10 and a connecting line between a rear end of the first contour line and the geometric center of the rotor part 30. Referring to FIG. 2, if the rotating direction of the rotor part 30 is counterclockwise, the front end of the first-type stator tooth 10 is the end that turns into the preset point first, and the rear end of the first-type stator tooth 10 is the end that turns into the preset point later, and front and rear ends of the second-type stator tooth are determined in the same way. In some embodiments, $0<\theta\pi/4-\alpha/2$.

Figure 4:
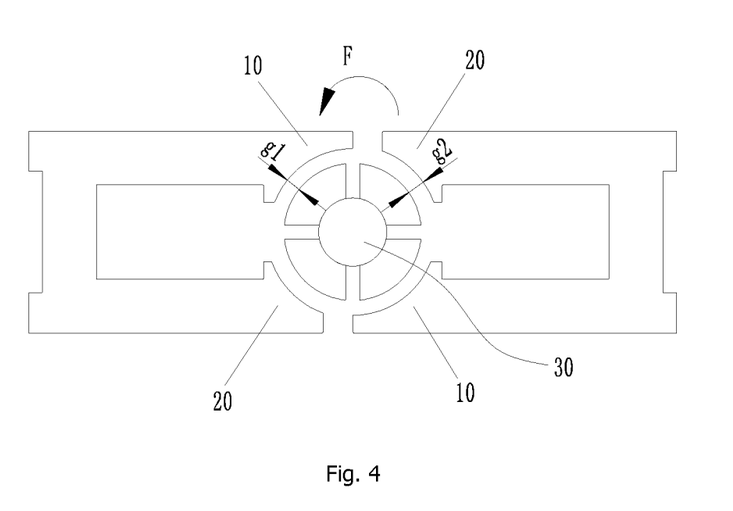
FIG. 4 shows a schematic structural diagram of a fourth embodiment of the single-phase permanent magnet synchronous motor according to the present disclosure.

Referring to FIG. 4, a uniform air gap thickness g2 is formed between the second-type stator tooth 20 and the rotor part 30, and a uniform air gap thickness g1 is formed between the first-type stator tooth 10 and the rotor part 30, wherein g1=g2. The corresponding air gap thicknesses under the stator teeth of the motor are all uniformly distributed, and the two types of stator teeth of different structures have the same air gap thickness, wherein the air gap thickness refers to a radial air gap thickness. In some embodiments, g1<g2. Both the air gap thicknesses g1 and g2 represent uniform air gap radial equal-thickness structures, and such configuration reduces the manufacturing difficulty and improves the manufacturing precision. That is, an air gap formed by the ends of an individual stator tooth on the motor and the rotor part 30 is a uniform and equal-thickness air gap, wherein the air gap thickness refers to a radial air gap thickness.

Figure 5:
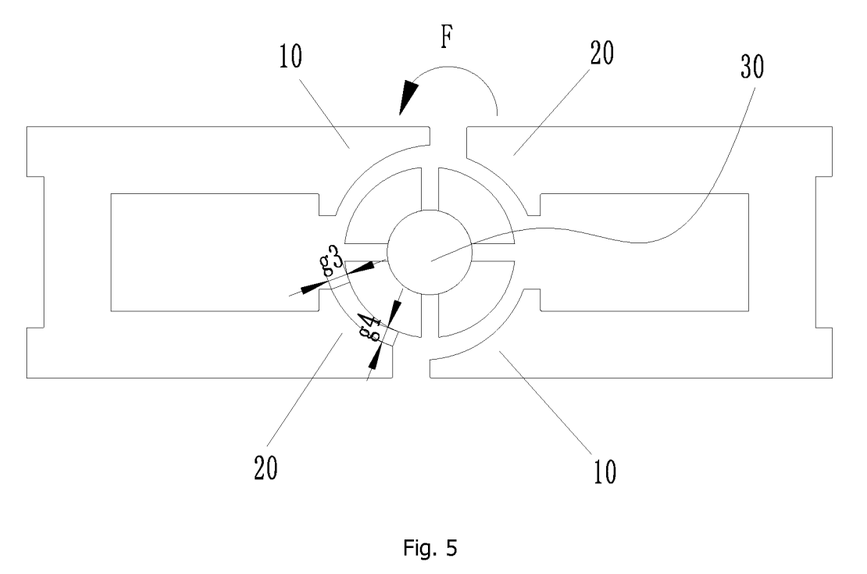
FIG. 5 shows a schematic structural diagram of a fifth embodiment of the single-phase permanent magnet synchronous motor according to the present disclosure.

The corresponding air gaps under the stator teeth of at least one type, i.e., one type of structure among the two types of stator teeth of different structures are gradual-change air gaps. That is, in some embodiments, the thickness of an air gap formed between the second-type stator tooth 20 and the rotor part 30 is set to gradually increase or gradually decrease along the circumference of the rotor part 30. The thickness of an air gap formed between the first-type stator tooth 10 and the rotor part 30 is set to gradually increase or gradually decrease along the circumference of the rotor part 30. Referring to FIG. 5, the air gap thickness of a gradual-change stator under the same tooth gradually decreases along a rotating direction of the motor, i.e., the rotating direction of the rotor part, wherein a maximum air gap thickness is g3 and a minimum air gap thickness is g4.

In some embodiments, the structure of at least one first-type stator tooth 10 of the plurality of first-type stator teeth 10 is different from the structures of the other first-type stator teeth 10 and the second-type stator teeth 20. That is, in addition to the first and second types of stator teeth, the motor has a third type of stator teeth or more types of stator teeth, and the sizes of contour lines of end faces of the stator teeth of different types facing the rotor part are different, and in the case where the motor includes an odd number of types of stator teeth, the number s of stator teeth included in the motor is an even number.

In some embodiments, as to the arrangement of different types of stator teeth, in one arrangement mode, the stator teeth are not arranged alternately and the motor stator teeth as a whole include two stator tooth sets, i.e., each stator tooth set only includes a same type of stator teeth. In another arrangement mode, there is alternate arrangement of stator teeth and also stator tooth sets, wherein each stator tooth set only includes a same type of stator teeth, and the number of stator teeth in the stator tooth set is greater than or equal to 2. In some embodiments, there are a plurality of first-type stator teeth 10 and a plurality of second-type stator teeth 20, and the plurality of first-type stator teeth 10 and the plurality of second-type stator teeth 20 enclose an annular working cavity. The plurality of first-type stator teeth 10 at least include two first-type stator teeth 10 arranged adjacent to each other; or the plurality of second-type stator teeth 20 at least include two second-type stator teeth 10 arranged adjacent to each other.

Figure 3:
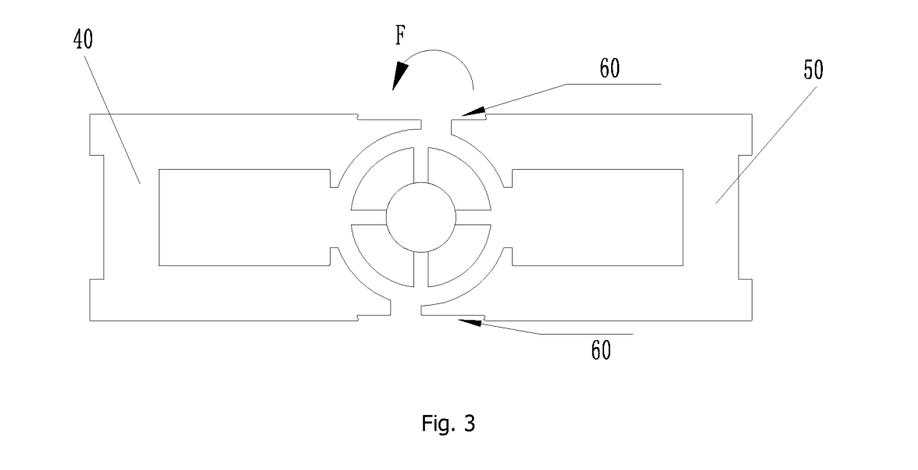
FIG. 3 shows a schematic structural diagram of a third embodiment of the single-phase permanent magnet synchronous motor according to the present disclosure.

Referring to FIGS. 1 and 3, the single-phase permanent magnet synchronous motor includes first stator body 40 and a second stator body 50. A plurality of first-type stator teeth 10 are connected to the first stator body 40. The second stator body 50 is arranged opposite to the first stator body 40, and the plurality of second-type stator teeth 20 are connected to the second stator body 50. Such configuration can facilitate installation of the motor, and improves the reliability of the motor.

In some embodiments, the first stator body 40 is integrally formed with the second stator body 50, and the transverse cross-section of the first stator body 40 and the second stator body 50 is circular or rectangular. That is, the motor stator structure is divided in some embodiments into two identical and independent parts, i.e., the first stator body 40 and the second stator body 50, similar to a C-shaped or U-shaped stator. Alternatively, the stator is an integral part, and its overall shape is round or rectangular in some embodiments.

Figure 6:
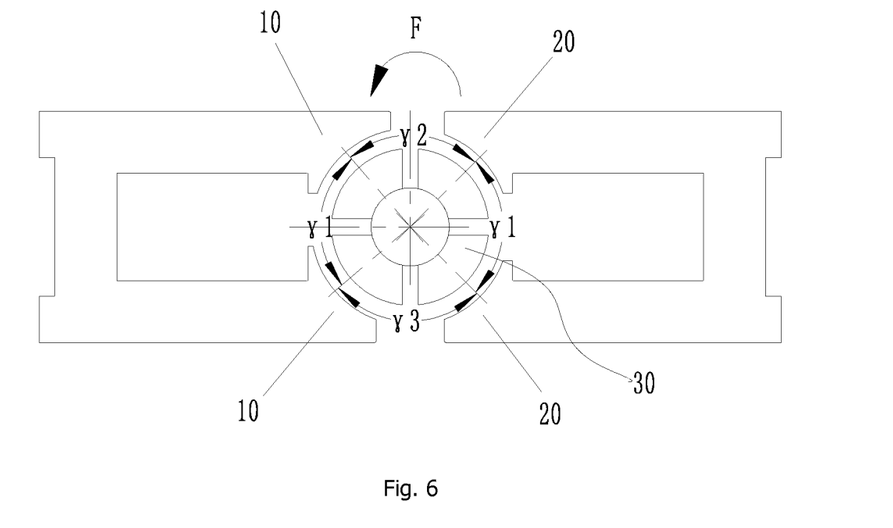
FIG. 6 shows a schematic structural diagram of a sixth embodiment of the single-phase permanent magnet synchronous motor according to the present disclosure.

Referring to FIG. 6, in some embodiments, a central angle formed by geometric centerlines of contour lines of two adjacent stator teeth of the same structure is $2\pi/s$. In some embodiments, a central angle formed by connecting lines between geometric centers of the first contour lines of two adjacent first-type stator teeth 10 and the geometric center of the rotor part 30 is $\gamma1$, wherein $\gamma1=2\pi/s$. A central angle formed by connecting lines between geometric centers of the adjacent second contour lines of the second stator body 50 and the geometric center of the rotor part 30 is also $\gamma1$. In some embodiments, with the first-type stator tooth 10 as a reference starting point, a central angle formed by a connecting line between the geometric center of the first contour line and the geometric center of the rotor part 30, and a connecting line between the second contour center of the second-type stator tooth 20 adjacent to the first-type stator tooth in the rotating direction of the rotor part 30 and the geometric center of the rotor part is $\gamma3$, wherein $\gamma3>2\pi/s$. Such configuration can effectively improve the performance of the motor.

In some embodiments, with the second-type stator tooth 20 as a reference starting point, a central angle formed by a connecting line between the geometric center of the first contour line of the first-type stator tooth 10 adjacent thereto in the rotating direction of the rotor part 30 and the geometric center of the rotor part 30, and a connecting line between the geometric center of the second contour and the geometric center of the rotor part is γ2, wherein γ2<2π/s. Such configuration can effectively improve the performance of the motor.

In some embodiments, with the first-type stator tooth 10 as a reference starting point, a central angle formed by a connecting line between the geometric center of the first contour line of the first-type stator tooth 10 adjacent thereto in the rotating direction of the rotor part 30 and the geometric center of the rotor part 30, and a connecting line between the geometric center of the second contour and the geometric center of the rotor part 30 is smaller than 2π/s.

In some embodiments, the total number of teeth of the two types of stator teeth of the motor is 2π, n being an integer greater than or equal to 1, wherein the numbers of the two types of stator teeth are not equal. That is, the number of teeth of one type of stator teeth is greater than that of another type of stator teeth. Moreover, in the case where the motor includes an odd number (3, 5, 7, . . . ) of types of stator teeth structures, the number of teeth included in the motor is a multiple of 2. In some embodiments, there are a plurality of first-type stator teeth 10 and a plurality of second-type stator teeth 20, and the number of the first-type stator teeth 10 and the number of the second-type stator teeth 20 are different. The structure of at least one first-type stator tooth 10 of the plurality of first-type stator teeth 10 is different from the structures of the other first-type stator teeth 10 and the second-type stator teeth 20.

Figure 7:
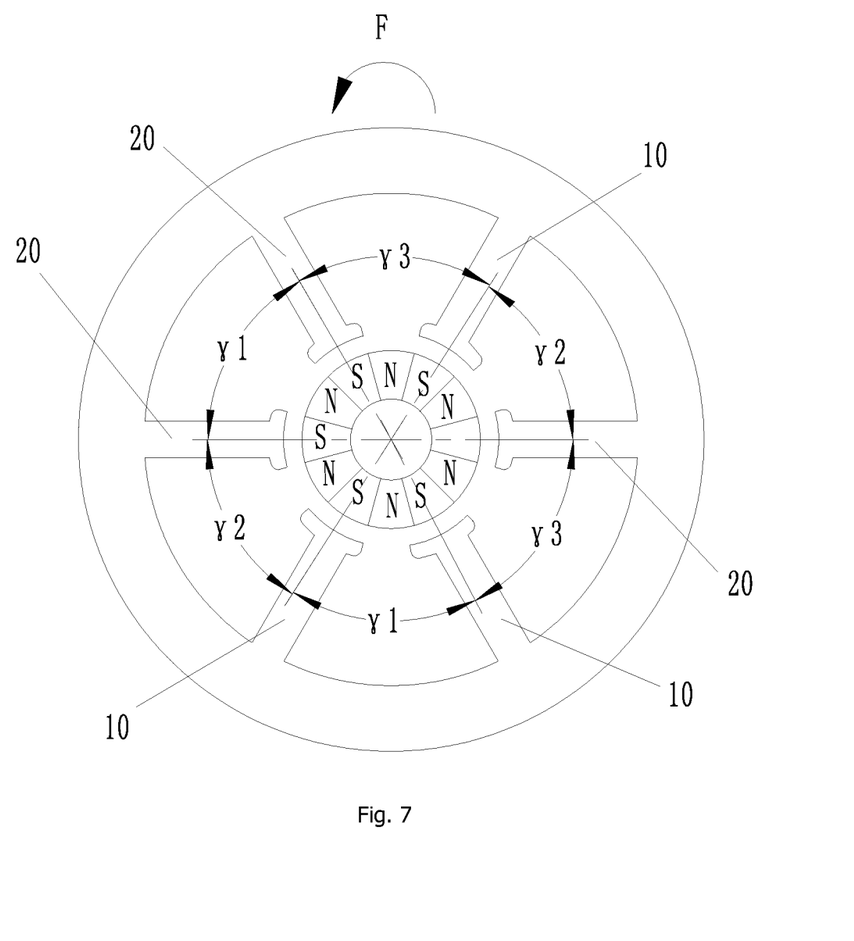
FIG. 7 shows a schematic structural diagram of a seventh embodiment of the single-phase permanent magnet synchronous motor according to the present disclosure.
Figure 8:
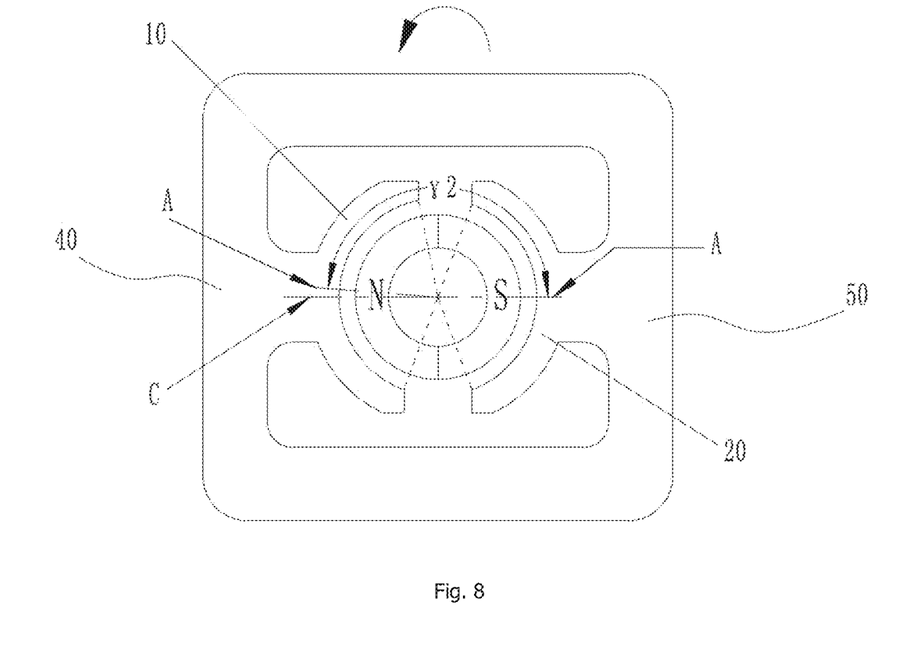
FIG. 8 shows a schematic structural diagram of an eighth embodiment of the single-phase permanent magnet synchronous motor according to the present disclosure.

Referring to FIGS. 1, 7 and 8, the first stator body 40 is integrally formed with the second stator body 50. The transverse cross-section of the first stator body 40 and the second stator body 50 are configured as an annular structure or a square structure, such as being c-shaped or U-shaped. Of course, referring to FIGS. 2 to 5, in some embodiments, the first stator body 40 and the second stator body 50 are arranged with a distance therebetween. Referring to FIG. 3, adjacent surfaces of the first stator body 40 and the second stator body 50 are provided with recessed portions 60. The recessed portions 60 are configured to be nested with related structures of a motor housing to fix a stator core.

In some embodiments, the single-phase permanent magnet synchronous motor in the above embodiment is also used in the technical field of dust collector equipment, i.e., the present disclosure provides a dust collector including a single-phase permanent magnet synchronous motor, which is the single-phase permanent magnet synchronous motor in the above embodiment.

Specifically, using the motor structure of the present disclosure effectively solves the start-up dead point problem of a single-phase motor, reduces the torque ripple of the motor, improves the output torque of the motor structure, eliminates the start-up dead point of the single-phase motor, reduces the manufacturing difficulty and improves the manufacturing precision.

In the present disclosure, a stator core of the motor includes at least two different types of stator tooth structures. The rotor part includes components such as a rotor and a rotating shaft. With a geometric center of the rotor as a circle center reference, the sizes of central angles corresponding to contours of parts of the stator teeth of different structures directly facing the rotor are different. As to the stator teeth of the motor, at least one set of adjacent stator teeth among all adjacent two stator teeth satisfies that the central angle formed by centerlines of the contours of the parts of the two stator teeth directly facing the rotor is not equal to 2π/s, where s is the number of stator teeth.

The motor has two types of stator teeth with different contour lengths, each type including 2 stator teeth, and the two types of stator teeth are arranged in a 1-to-1 alternate manner, which can eliminate an unbalanced magnetic pull generated due to the different tooth structures. Stator teeth of the same type are obtained by rotating a single stator tooth around the center of the rotor through a circumferential array. A stator tooth is called a large tooth if a central angle corresponding to a contour thereof is large, and a stator tooth is called a small tooth if a central angle corresponding to a contour thereof is small. With a small tooth of the stator core as a reference, a central angle between a contour center of a large tooth adjacent thereto in the rotating direction and a contour center of the small tooth is γ, where γ<2π/s, where s is the number of stator teeth.

With a contour centerline of the small tooth as a reference, a line at an angle of 2π/s degrees with the contour centerline of the small tooth is a tooth offset baseline of the large tooth, and an offset angle of the large tooth of the motor is θ=a−b. The value range of θ is 0 <θ<π/2−α, where α is a central angle spanned by the contour of the small tooth of the motor. If the offset angle is too small, a starting torque generated is small, and if the offset angle is too large, magnetic leakage between the large tooth and an adjacent stator tooth increases.

The motor has two types of stator teeth with different contour lengths, and the two types of stator teeth may also be arranged in the following modes:

1. The two types of stator teeth are not arranged alternately and the motor stator teeth as a whole include two stator tooth sets, i.e., each stator tooth set only includes a same type of stator teeth.

2. There is alternate arrangement of the two types of stator teeth and also stator tooth sets, wherein each stator tooth set only includes a same type of stator teeth, and the number of stator teeth in the stator tooth set is greater than or equal to 2.

A relationship between the stator teeth in the two additional stator tooth arrangement modes is: a central angle formed by contour centerlines of two adjacent stator teeth of the same structure is 2π/s. With a contour centerline of a small tooth (a tooth with a small central angle) as a reference, a central angle between a contour centerline of a large tooth adjacent thereto in the rotating direction of the motor and the contour centerline of the small tooth is smaller than 2π/s. With a contour centerline of a large tooth as a reference, a central angle between a contour centerline of a small tooth adjacent thereto in the rotating direction of the motor and the contour centerline of the large tooth is greater than 2*π/s.

In the present disclosure, the start-up dead point problem of a single-phase permanent magnet motor is solved by providing asymmetric stator tooth structures to increase the starting torque of the single-phase permanent magnet motor, increase the output torque and reduce the torque ripple.

In a single-phase permanent magnet motor, an armature current is only at one phase, a magnetic field generated by an armature winding is a pulsating magnetic field, and an electromagnetic torque of the motor has a point 0. If the single-phase permanent magnet motor does not use a specific structure, its motor stop position (a point where a cogging torque is 0) coincides with the point where the electromagnetic torque is 0. Regardless of the form of current into a stator winding of the motor, the single-phase motor cannot generate a tangential torque, and the single-phase motor cannot be started in this case, so the single-phase motor has a start-up dead point problem. A general solution is to provide asymmetrical tooth structures so that the cogging torque and the electromagnetic torque of the motor deviate from each other, and 0-point positions of the two torques are staggered. The motor stops at the point where the cogging torque is 0. The motor can be started normally as long as the electromagnetic torque of the motor is not 0 at that time.

Referring to FIG. 1, by configuring central angles of contour lines of end faces of different stator teeth, the point 0 of the cogging torque and the point 0 of the electromagnetic torque are staggered from each other, thereby eliminating the start-up dead point problem. In some embodiments, a stator core of the motor includes at least two different types of stator tooth structures. The sizes of central angles corresponding to contour lines of the cannot stator teeth of different structures directly facing the rotor part are different. As to the stator teeth of the motor, at least one set of adjacent stator teeth among all adjacent two stator teeth satisfies that the central angle formed by centerlines of the contour lines of the two stator teeth directly facing the rotor part is not equal to $2\pi/s$, where s is the number of stator teeth. Characteristics of different stator core structures are analyzed in detail by setting the number of types of stator teeth and the number of stator teeth of the motor.

In some embodiments, the motor has two types of stator teeth of different structures, and the number of stator teeth is 4, and the number of stator teeth is 2 for each of the two types of stator teeth. The two types of stator tooth structures are arranged in a 1-to-1 alternate manner in the rotating direction of the motor (1212 . . . structure, where 1 and 2 indicate two different types of stator teeth), and the same type of stator teeth are obtained by rotating a single stator tooth around the center of the circumference. The alternate placement can eliminate an unbalanced magnetic pull generated due to different tooth structures.

With a small tooth as a reference, a central angle between a contour line center of a large tooth adjacent thereto in the rotating direction and a contour center of the small tooth is smaller than $2\pi/s$. With such tooth structures, a phase angle of an electromagnetic torque offset is larger than a cogging torque, so to generate a positive starting torque and enable the motor to start at a large angle, a tooth offset direction needs to be set opposite to the rotating direction of the motor.

With a geometric centerline of a contour line of the small tooth as a reference, a line at an angle of $2\pi/s$ degrees with the geometric centerline of the contour line of the small tooth is a tooth offset baseline of the large tooth, and an offset angle of the large tooth of the motor is $\theta=a-b$. Referring to FIG. 2, the value range of $\theta$ is $0<\theta<\pi/2-\alpha$, where $\alpha$ is a central angle spanned by the contour line of the small tooth of the motor. A suitable $\theta$ value can effectively improve the starting torque of the motor without affecting the output torque of the motor. Too large a $\theta$ value causes magnetic leakage between two adjacent stator teeth, and too small a $\theta$ value leads to poor starting capability of the motor and a large starting current of the motor. Air gaps under all stator teeth of the motor are uniform air gap structures, i.e., an air gap thickness under one tooth is invariable, with reference to FIG. 2.

The configuration of the large and small tooth structures described above can just eliminate the start-up dead point of the motor, so all air gap thicknesses of the motor are set to be the same. The use of uniform air gaps can reduce an average air gap thickness of the motor, reduce the torque ripple and increase the output torque. Based on the structure of FIG. 2, by cutting off parts of a stator tooth body core, recessed structures are formed on upper and lower sides of the overall core, referring to FIG. 3, for nesting with related structures of a motor housing to fix the stator core.

To further improve the starting capability of the motor, in some embodiments, the air gap thicknesses under different teeth are set to be different, i.e., the corresponding air gap thickness under the same stator tooth of the motor is uniformly distributed, but the air gap thicknesses corresponding to two different types of teeth are different. The air gap thickness corresponding to the large tooth is smaller than the air gap thickness corresponding to the small tooth, i.e., $g1<g2$, with reference to FIG. 4. Configuring the uniform air gaps of different thicknesses for the two different types of stator teeth can further enhance the effect of asymmetric teeth, improve the starting torque and reduce the starting current.

The air gaps corresponding to the stator teeth of at least one type of structure among the stator teeth of two types of structures of the motor are gradual-change air gaps, with reference to FIG. 5. The gradual-change air gaps can also eliminate the start-up dead point of the motor, and the two types of structures used together can greatly increase the starting torque and reduce the starting current. To obtain a positive starting torque, under the same stator teeth, the motor air gap gradually decreases along the rotating direction of the motor, wherein a maximum air gap thickness is g3 and a minimum air gap thickness is g4, i.e., $g3>g4$.

As to the arrangement of the stator teeth of the motor, in some embodiments, for 4 or more stator teeth, the two types of stator teeth are not arranged alternately and the motor stator teeth as a whole include two stator tooth sets, i.e., each stator tooth set only includes a same type of stator teeth (1 . . . 1122 . . . 2 structure, where 1 and 2 indicate two different types of stator teeth), with reference to FIG. 6. A central angle formed by geometric centerlines of contour lines of two adjacent stator teeth of the same structure is $\gamma1=2\pi/s$.

With a contour centerline of a small tooth as a reference, a central angle between a contour centerline of a large tooth adjacent thereto in the rotating direction of the motor and the contour centerline of the small tooth is $\gamma2<2\pi/s$. With a geometric centerline of a contour line of a large tooth as a reference, a central angle between a geometric centerline of a contour line of a small tooth adjacent thereto in the rotating direction of the motor and the geometric centerline of the contour line of the large tooth is $\gamma3>2\pi/s$. Although the arrangement with the 1 . . . 1122 . . . 2 structure leads to some unbalanced magnetic pull, it still has certain advantages over the gradual-change air gap structure, and has a smaller cogging torque ripple and a larger starting torque, and can thereby reduce the starting current.

In some embodiments, there is alternate arrangement of the two types of stator teeth and also stator tooth sets, wherein each stator tooth set only includes a same type of stator teeth, and the number of stator teeth in the stator tooth set is greater than or equal to 2, with reference to FIG. 7.

The above description of the stator core of the motor only defines the stator tooth structures. A yoke part of the stator core of the motor in some embodiments is in the shape of a closed ring, a closed frame, or an open frame, such as being C-shaped, U-shaped, etc. See FIG. 8 for a closed-frame yoke part for two types of stator teeth of different structures with 2 teeth.

Figure 9:
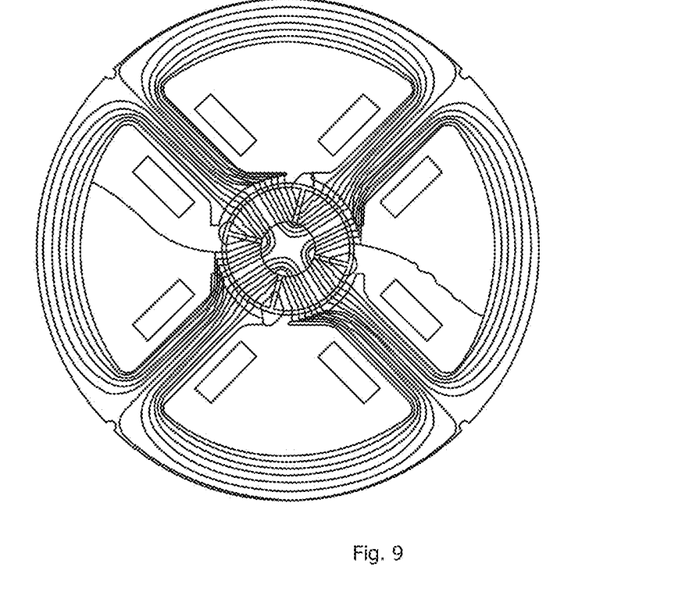
FIG. 9 shows a schematic diagram of a rotor position of the single-phase permanent magnet synchronous motor according to the present disclosure at time 0s.
Figure 10:
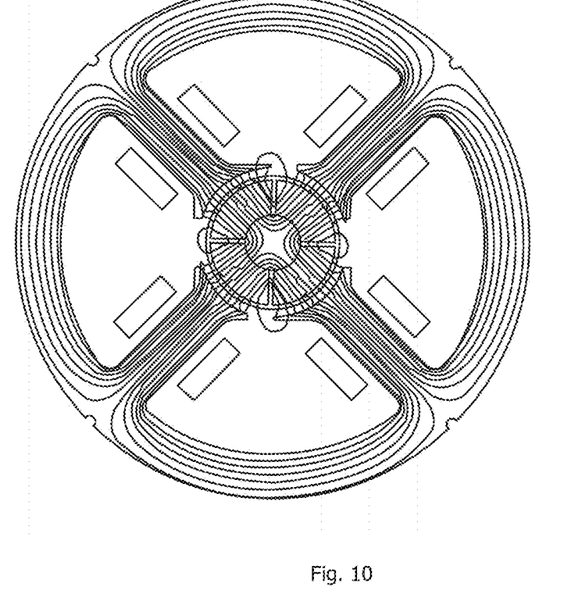
FIG. 10 shows a schematic diagram of a rotor position of the single-phase permanent magnet synchronous motor according to the present disclosure at a cogging torque of 0.
Figure 11:
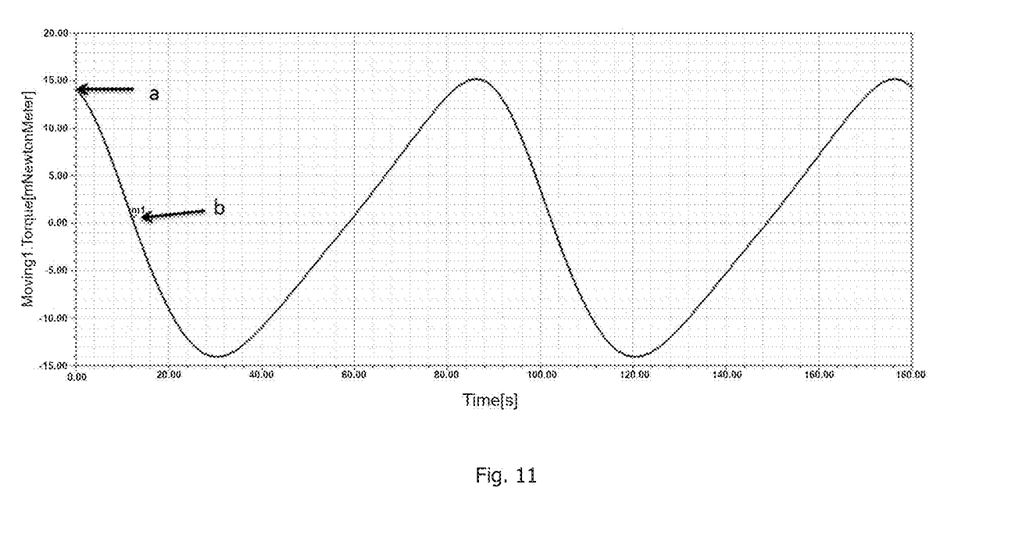
FIG. 11 shows a schematic diagram of cogging torques of the single-phase permanent magnet synchronous motor according to the present disclosure corresponding to different rotor positions.
Figure 12:
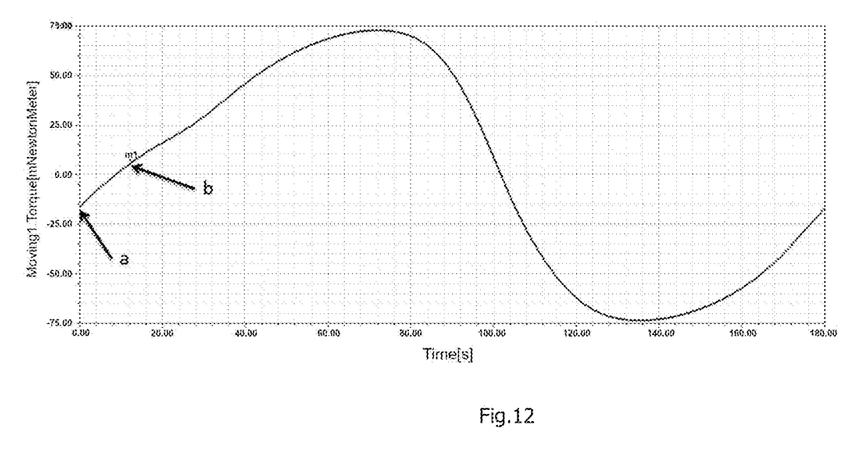
FIG. 12 shows a schematic diagram of starting torques of the single-phase permanent magnet synchronous motor according to the present disclosure corresponding to different rotor positions under a same current.
Figure 13:
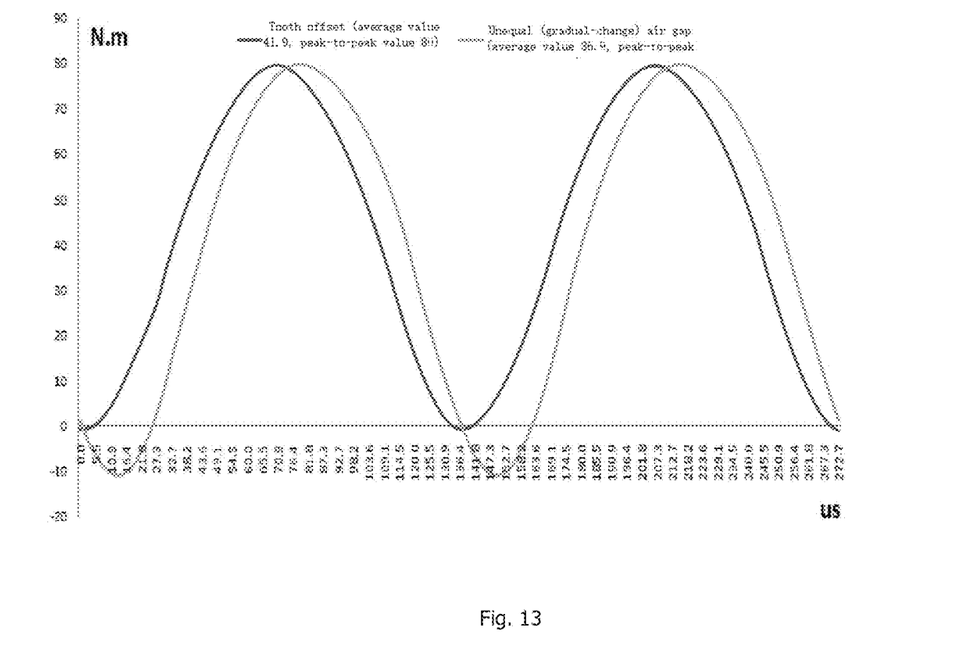
FIG. 13 shows a schematic diagram of output torques of the single-phase permanent magnet synchronous motor according to the present disclosure with different stator structures under the condition of a same average air gap thickness.

See FIGS. 9 and 10, which show a rotor position (b) of the motor at time 0s and at a cogging torque of 0, corresponding to points a and b in FIGS. 11 and 12. It can be seen from FIG. 12 that the starting torque of the motor is greater than 0 at the time of the cogging torque of 0, such that the motor can be started by itself after the winding is energized at a static state, thereby solving the start-up dead point problem of the single-phase motor. FIG. 13 illustrates that under the condition of the same average air gap thickness, a motor with a tooth offset structure has a larger output torque and a smaller torque ripple compared with a common motor with an unequal air gap (gradual-change air gap) structure, which is conducive to reducing motor operation noise and achieves a better application effect.

For ease of description, spatially relative terms such as "over . . . ", "above . . . ", "on an upper surface of . . . " and "upper" are used here to describe spatial positional relationship between one device or feature and other devices or features as shown in the figures. It should be understood that a spatially relative term is intended to encompass different orientations in use or operation other than the orientation of a device described in a figure. For example, if the device in the figure is inverted, then the device described as "above other devices or structures" or "over other devices or structures" will be positioned "below other devices or structures" or "under other devices or structures". Thus, the exemplary term "above . . . " in some embodiments includes both orientations of "above . . . " and "below . . . ". The device is be positioned in other different ways (rotated by 90° or in other orientations) in some embodiments, and the relative spatial description used here is construed accordingly.

In addition to the above description, it also needs to be noted that "an embodiment", "another embodiment", "embodiments", and or the like mentioned in this specification means that a specific feature, structure, or characteristic described in conjunction with the embodiment is included in at least one embodiment described generally in the present disclosure. A same expression in multiple places in the specification do not necessarily refer to a same embodiment. Further, when a specific feature, structure, or characteristic is described in conjunction with any embodiment, it is claimed is that implementations of such a feature, structure, or characteristic in conjunction with other embodiments also fall within the scope of the present disclosure.

In the above embodiments, each embodiment is described with a focus, and for parts of an embodiment that are not described in detail, see relevant description of other embodiments.

Described above are only preferred embodiments of the present disclosure, which are not intended to limit the present disclosure, and there are various changes and variations of the present disclosure for those skilled in the art. All modifications, equivalent substitutions, improvements and the like made within the spirit and principle of the present disclosure should be encompassed within the protection scope of the present disclosure.

The invention claimed is:

1. A single-phase permanent magnet synchronous motor, comprising a plurality of types of stator teeth, the plurality of types of stator teeth comprising at least:
a first-type stator tooth; and
a second-type stator tooth, the first-type stator tooth and the second-type stator tooth enclosing an annular working cavity for accommodating a rotor part,
wherein the size of a central angle corresponding to a first contour line of an end face of the first-type stator tooth facing the rotor part is different from the size of a central angle corresponding to a second contour line of an end face of the second-type stator tooth facing the rotor part,
wherein there are a plurality of first-type stator teeth and a plurality of second-type stator teeth, and the plurality of first-type stator teeth and the plurality of second-type stator teeth enclose the annular working cavity; and the plurality of first-type stator teeth at least comprise two first-type stator teeth arranged adjacent to each other, and the plurality of second-type stator teeth at least comprise two first-type stator teeth arranged adjacent to each other; or
wherein the plurality of first-type stator teeth at least comprise two first-type stator teeth arranged adjacent to each other, or the plurality of second-type stator teeth at least comprise two first-type stator teeth arranged adjacent to each other;
wherein the single-phase permanent magnet synchronous motor comprises: a first stator body, with the plurality of first-type stator teeth being connected to the first stator body; and a second stator body, the second stator body being arranged opposite to the first stator body, with the plurality of second-type stator teeth being connected to the second stator body;
wherein a central angle formed by connecting lines between two geometric centers of the first contour lines of two adjacent first-type stator teeth and the geometric center of the rotor part is $\gamma 1$, and a central angle formed by connecting lines between two geometric centers of two adjacent second contour lines of the second stator body and the geometric center of the rotor part is $\gamma 1$; or
wherein a central angle formed by connecting lines between two geometric centers of the first contour lines of two adjacent first-type stator teeth and the geometric center of the rotor part is $\gamma 1$, or a central angle formed by connecting lines between two geometric centers of two adjacent second contour lines of the second stator body and the geometric center of the rotor part is $\gamma 1$, wherein $\gamma 1=2\pi/s$, where s is the total number of the first-type stator tooth and the second-type stator tooth.

2. The single-phase permanent magnet synchronous motor according to claim 1, wherein $s=2n$, the number of the first-type stator tooth and the number of the second-type stator tooth are n, and n is an integer greater than or equal to 1.

3. The single-phase permanent magnet synchronous motor according to claim 1, wherein a uniform air gap thickness $g2$ is formed between the second-type stator tooth and the rotor part, and a uniform air gap thickness $g1$ is formed between a first-type stator tooth and the rotor part, wherein $g1=g2$.

4. The single-phase permanent magnet synchronous motor according to claim 1, wherein a uniform air gap thickness $g2$ is formed between the second-type stator tooth and the rotor part, and a uniform air gap thickness $g1$ is formed between the first-type stator tooth and the rotor part, wherein $g1<g2$.

5. The single-phase permanent magnet synchronous motor according to claim 1, wherein
the thickness of an air gap formed between the second-type stator tooth and the rotor part is set to gradually increase or gradually decrease along the circumference of the rotor part, and the thickness of an air gap formed between the first-type stator tooth and the rotor part is set to gradually increase or gradually decrease along the circumference of the rotor part; or the thickness of an air gap formed between the second-type stator tooth and the rotor part is set to gradually increase or gradually decrease along the circumference of the rotor part, or the thickness of an air gap formed between the first-type stator tooth and the rotor part is set to gradually increase or gradually decrease along the circumference of the rotor part.

6. The single-phase permanent magnet synchronous motor according to claim 1, wherein with the first-type stator tooth as a reference starting point, a central angle formed by a connecting line between the geometric center of the first contour line and the geometric center of the rotor part, and a connecting line between the second contour center of the second-type stator tooth adjacent to the first-type stator tooth in the rotating direction of the rotor part and the geometric center of the rotor part is γ3, wherein γ3>2π/s, where s is the total number of the first-type stator tooth and the second-type stator tooth.

7. The single-phase permanent magnet synchronous motor according to claim 1, wherein with the second-type stator tooth as a reference starting point, a central angle formed by a connecting line between the geometric center of the first contour line of the first-type stator tooth adjacent thereto in the rotating direction of the rotor part and the geometric center of the rotor part, and a connecting line between the geometric center of the second contour of the second-type stator tooth and the geometric center of the rotor part is γ2, wherein γ2<2π/s, where s is the total number of the first-type stator tooth and the second-type stator tooth.

8. The single-phase permanent magnet synchronous motor according to claim 1, wherein the first stator body is integrally formed with the second stator body, and the transverse cross-section of the first stator body and the second stator body is circular or rectangular.

9. The single-phase permanent magnet synchronous motor according to claim 1, wherein the first stator body and the second stator body are arranged with a distance therebetween; and adjacent surfaces of the first stator body and the second stator body are provided with recessed portions.

10. The single-phase permanent magnet synchronous motor according to claim 1, wherein there are a plurality of first-type stator teeth and a plurality of second-type stator teeth, and the number of the first-type stator teeth and the number of the second-type stator teeth are different.

11. The single-phase permanent magnet synchronous motor according to claim 10, wherein the structures of the plurality of first-type stator teeth are different from the structures of the second-type stator teeth.

12. The single-phase permanent magnet synchronous motor according to claim 1, wherein along a rotating direction of the rotor part, the size of the central angle corresponding to the first contour line is greater than the size of the central angle corresponding to the second contour line, wherein with the second-type stator tooth as a reference starting point, along the rotating direction of the rotor part, a central angle formed by geometric centerlines of the contour lines of the end faces of the second-type stator tooth and the first-type stator tooth adjacent to the second-type stator tooth facing the rotor part is smaller than 2π/s.

13. The single-phase permanent magnet synchronous motor according to claim 1, wherein in the first-type stator tooth and the second-type stator tooth adjacent to each other, a geometric centerline of the first contour line in a radial direction of the rotor part and a geometric centerline of the second contour line in the radial direction of the rotor part intersect and form an included angle γ, wherein γ≠2π/s, where s is the total number of the first-type stator tooth and the second-type stator tooth.

14. The single-phase permanent magnet synchronous motor according to claim 1, wherein with the geometric centerline of the second contour line in the radial direction of the rotor part as a reference line, an offset baseline of the first-type stator tooth is formed at an angle of 2π/s along the rotating direction of the rotor part, and an offset angle θ is formed between the geometric centerline of the first contour line in the radial direction of the rotor part and the offset baseline, wherein θ=a−b, and 0<θ<π/2−α, where α is the central angle formed by connecting lines between two ends of the second contour line and a geometric center of the rotor part, and b is a central angle formed by the offset baseline and a connecting line between a front end of the first contour line and the geometric center of the rotor part, and a is a central angle formed by the offset baseline of the first-type stator tooth and a connecting line between a rear end of the first contour line and the geometric center of the rotor part.

15. A dust collector, comprising a single-phase permanent magnet synchronous motor, wherein the single-phase permanent magnet synchronous motor comprises a plurality of types of stator teeth, the plurality of types of stator teeth comprising at least:
a first-type stator tooth; and
a second-type stator tooth, the first-type stator tooth and the second-type stator tooth enclosing an annular working cavity for accommodating a rotor part,
wherein the size of a central angle corresponding to a first contour line corresponding to an end face of the first-type stator tooth facing the rotor part is different from the size of a central angle corresponding to a second contour line of an end face of the second-type stator tooth facing the rotor part,
wherein there are a plurality of first-type stator teeth and a plurality of second-type stator teeth, and the plurality of first-type stator teeth and the plurality of second-type stator teeth enclose the annular working cavity; and the plurality of first-type stator teeth at least comprise two first-type stator teeth arranged adjacent to each other, and the plurality of second-type stator teeth at least comprise two first-type stator teeth arranged adjacent to each other; or
wherein the plurality of first-type stator teeth at least comprise two first-type stator teeth arranged adjacent to each other, or the plurality of second-type stator teeth at least comprise two first-type stator teeth arranged adjacent to each other;
wherein the single-phase permanent magnet synchronous motor comprises: a first stator body, with the plurality of first-type stator teeth being connected to the first stator body; and a second stator body, the second stator body being arranged opposite to the first stator body, with the plurality of second-type stator teeth being connected to the second stator body;
wherein a central angle formed by connecting lines between two geometric centers of the first contour lines of two adjacent first-type stator teeth and the geometric center of the rotor part is γ1, and a central angle formed by connecting lines between two geometric centers of two adjacent second contour lines of the second stator body and the geometric center of the rotor part is γ1; or
wherein a central angle formed by connecting lines between two geometric centers of the first contour lines of two adjacent first-type stator teeth and the geometric center of the rotor part is γ1, or a central angle formed by connecting lines between two geometric centers of two adjacent second contour lines of the second stator body and the geometric center of the rotor part is $\gamma 1$, wherein $\gamma 1 = 2\pi/s$, where s is the total number of the first-type stator tooth and the second-type stator tooth.

16. The dust collector according to claim 15, wherein in the first-type stator teeth and the second-type stator teeth adjacent to each other, a geometric centerline of the first contour line in a radial direction of the rotor part and a geometric centerline of the second contour line in the radial direction of the rotor part intersect and form an included angle $\gamma$, wherein $\gamma \neq 2\pi/s$, where s is the total number of the first-type stator tooth and the second-type stator tooth.

* * * * *

UNITED STATES PATENT AND TRADEMARK OFFICE
CERTIFICATE OF CORRECTION

| | |
|---|---|
| PATENT NO. | : 12,206,287 B2 |
| APPLICATION NO. | : 17/765299 |
| DATED | : January 21, 2025 |
| INVENTOR(S) | : Yusheng Hu et al. |

It is certified that error appears in the above-identified patent and that said Letters Patent is hereby corrected as shown below:

In the Claims

Column 16, Line 12, Claim 14, delete "0<0 <π/2-α," and insert -- $0 < \theta < \pi/2 - \alpha$, --

Signed and Sealed this
Sixth Day of May, 2025

Coke Morgan Stewart
*Acting Director of the United States Patent and Trademark Office*